United States Patent
Imamura et al.

[11] Patent Number: 6,054,004
[45] Date of Patent: Apr. 25, 2000

[54] HEAT-INSULATING STRUCTURE AND METHOD OF MANUFACTURING THE SAME

[75] Inventors: Haruki Imamura; Tadashi Yoshikawa; Gen Itafuji; Hiroyuki Iwadera, all of Tokyo, Japan

[73] Assignee: MAG Co., Ltd., Tokyo, Japan

[21] Appl. No.: 08/983,152

[22] PCT Filed: Jul. 14, 1996

[86] PCT No.: PCT/JP96/01968

§ 371 Date: Apr. 6, 1998

§ 102(e) Date: Apr. 6, 1998

[87] PCT Pub. No.: WO97/04192

PCT Pub. Date: Feb. 6, 1997

[30] Foreign Application Priority Data

Jul. 14, 1995 [JP] Japan ................................. 7-178356

[51] Int. Cl.[7] ................................................ B31F 53/06
[52] U.S. Cl. ..................... 156/204; 156/216; 156/223; 156/295; 156/300
[58] Field of Search ........................... 428/121, 123, 428/126, 129, 130; 156/295, 300, 311, 204, 216, 223

[56] References Cited

U.S. PATENT DOCUMENTS

| | | |
|---|---|---|
| 1,583,744 | 2/1981 | Peatling . |
| 4,953,344 | 9/1990 | Wallace ........................... 53/528 |
| 5,591,505 | 1/1997 | Rusek, Jr. et al. ................. 428/69 |

FOREIGN PATENT DOCUMENTS

| | | | |
|---|---|---|---|
| 58-43263 | 9/1983 | Japan .......................... B29J 1/02 |
| 63-26489 | 7/1988 | Japan .......................... E04B 1/80 |
| 60-191330 | 12/1998 | Japan .......................... B32B 7/12 |

*Primary Examiner*—Blaine Copenheaver
*Assistant Examiner*—Ula C. Ruddock
*Attorney, Agent, or Firm*—Schwegman, Lundberg, Woessner & Kluth P.A.

[57] ABSTRACT

Disclosed is a heat insulating structure in which the surrounding of a heat insulating material such as glass wool is covered with and glued to a casing material such as a poly-film, wherein hotmelts (4,5,6) are applied to the center part or all and an inner portion d and an outer portion e of both ends of a poly-film (3b), and a glass wool (2) is placed on the center to apply a hotmelt (7) to the surface, which is then covered with an aluminum deposition poly-film. In the lower reaches of the conveyer, both ends of the lower poly-film (3b) are folded at the divided line between the inner portion d and the outer portion e to form a three-ply structure, which is pressed to fix, is cooled to normal temperature, and is cured. This heat insulating structure is featured in that improvement in productivity and high adhesive strength can be attained.

4 Claims, 3 Drawing Sheets

HEAT-INSULATING STRUCTURE AND METHOD OF MANUFACTURING THE SAME

TECHNICAL FIELD

This Invention relates to an improvement in a heat insulating structure which is formed by covering the surrounding of a fibrous heat insulating material such as glass wool with a casing material such as a poly-film.

BACKGROUND ART

As shown in FIG. 5, conventionally, a heat insulating structure 51 for building material is manufactured as follows: The surface of a heat insulating material 52 such as fibrous glass wool is covered with a casing material such as an aluminum deposition poly-film 53a. The back face of the heat insulating material is (covered with a casing material of a poly-film 53b. The poly-films 53a, 53b are allowed to adhere to the heat insulating material 52 using a hotmelt 54. Each end of the upper aluminum deposition poly-film 53a is wrapped in each corresponding end of the lower poly-film 53b to form a three-ply structure portion 55, in which poly-films 53a and 53b are allowed to adhere each other by means of thermal fusion.

In the thermal fusion, for example, scored fusing portions f are formed at certain intervals as shown in FIG. 6 or a continuously meandered fusing portion g is formed as shown in FIG. 7, in the longitudinal direction on the portion 55. With this structure, the work especially for integrating the heat insulating structure to, for example, the back face of a wall material does not cause the fused portions to be easily peeled off even if the ply portions 55 of the both ends of the heat insulating structure are pulled in a lateral direction by both hands.

However, in the above-mentioned technology, the three sheets of poly-films 53a and 53b of the portion 55 are fused simultaneously though these form a three-ply structure. This provides combined portions with the same shape and fused portions limited to the scored line parts or the continuously meandered part, which are a part of the face of the portion 55, so that the adhesion of the entire faces of the films are not allowed, exhibiting the problem of weak adhesive force. Also, in the case of thermal fusion in scored portions, for example, a thermal body like a gear is pressed to the portion 55 while it is rotated and the poly-films 53a and 53b are moved in the longitudinal direction, to carry out the thermal fusion continuously. However, if the moving speed for the adhesion is too high, only an insufficient result of fusion is obtained whereas if the moving speed is too low, even the portions around the scored portions melt away, exhibiting the problem that the heating temperature and the heating time are limited. For example, the adhesion speed is limited to about 40 m/minute, which proves that this method lacks flexibility.

DISCLOSURE OF INVENTION

The present invention has been achieved in view of this situation and has an object of providing a heat insulating structure and a method for manufacturing the heat insulating structure which can improve productivity.

The above objects can be attained in the present invention by a heat insulating structure produced by covering the surface and back face of a fibrous heat insulating material with casing materials to glue the casing materials to the heat insulating material and by gluing both ends of the casing materials each other to fix the casing materials each other, wherein the heat insulating material and each of the casing materials are glued and the casing materials are glued each other using a hotmelt.

It is preferable that a high polymer film be used as the casing material and that a thermoplastic high polymer be used as the hotmelt.

Also, the above objects can be attained by a provision of a method for manufacturing a heat insulating structure comprising a step of covering the surface and back face of a fibrous heat insulating material with casing materials to glue the casing materials to the heat insulating material and a step of gluing both ends of the casing materials each other to fix the both casing materials each other, wherein the heat insulating material and each of the casing materials are secured and the casing materials are secured each other by applying a hotmelt to the casing materials at a prescribed speed along the longitudinal direction of the heat insulating structure and then the applied parts are sequentially glued.

In the above manufacturing method, it is desirable that the application speed and the gluing speed be both 10 to 200 m/minute.

Also, the heat insulating structure corresponding to the present invention comprises a first poly-film sheet, a fibrous heat insulating material disposed on the first poly-film sheet, and a second poly-film sheet covering the fibrous heat insulating material in a manner that the fibrous heat insulating material is sandwiched between the second poly-film sheet and the first poly-film sheet facing the first poly-film sheet and having ends provided with a combination portion which is combined with a combination portion of the first poly-film sheet and which is disposed along the periphery of the fibrous heat insulating material, wherein the combination portions of the first and second poly-film sheets are glued each other using a hotmelt. It is desirable that the hotmelt be applied on at least one of the combined portions of the first and second poly-film sheets so that it extends in the longitudinal direction along the periphery of the fibrous heat insulating material. Also, it is desirable that the combination portion be provided with a three-ply structure in which the end of the first poly-film sheet is folded so as to sandwich and wrap the end of the second poly-film sheet. The combination portions of the pair of first and second poly-film sheets are glued each other via the hot melt.

If the heat insulating material and each of the casing materials are glued and the casing materials are glued each other in the method in which a hotmelt heated and melted in advance is applied and cured at normal temperature, the productivity is outstandingly improved since there is theoretically no upper limit to the application speed of the hotmelt.

Some experiments were made at application speeds ranging from 10 to 200 m/minute according to this teaching and as a result the gluing process could be performed without any practical problem.

Also, a range of the application of a hot melt can be designed in a free manner. For example, if the hotmelt is uniformly applied to the whole adhesive surface, the adhesive force can be strengthened.

BEST MODE FOR CARRYING OUT THE INVENTION

The present invention will now be explained in detail with reference to the appended drawings.

Figure 1:
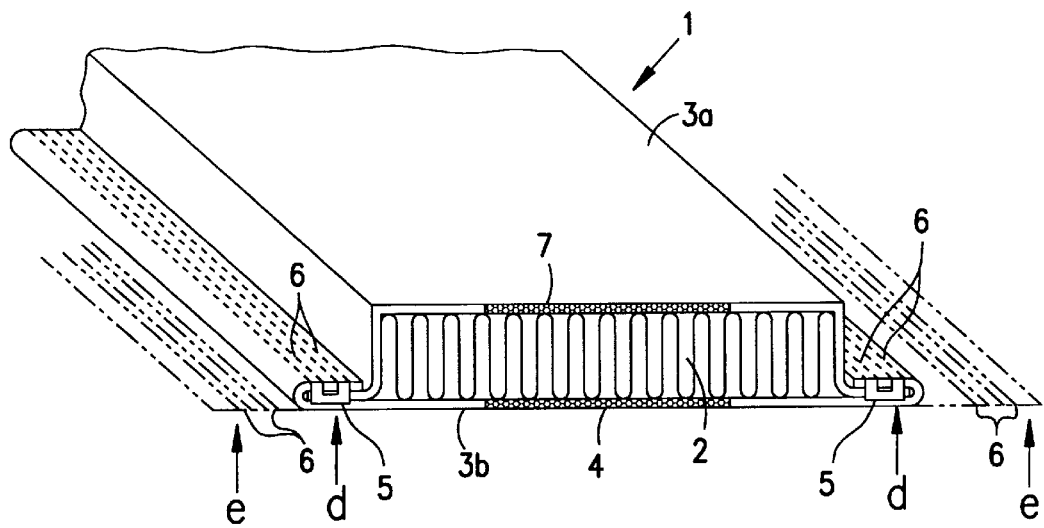
FIG. 1 is a perspective view of the heat insulating structure of the present invention.
Figure 2:
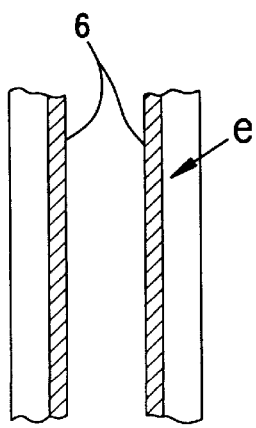
FIG. 2 is a top plan view showing the applied condition of a hotmelt in one combination portion of films as casing materials having a three-ply structure at the end of the heat insulating structure shown in FIG. 1.
Figure 3:
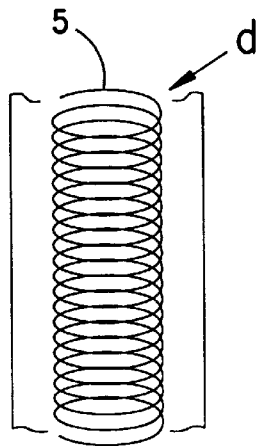
FIG. 3 is a top plan view showing the applied condition of a hotmelt in the other combination portion of films as casing materials having a three-ply structure.
Figure 4:
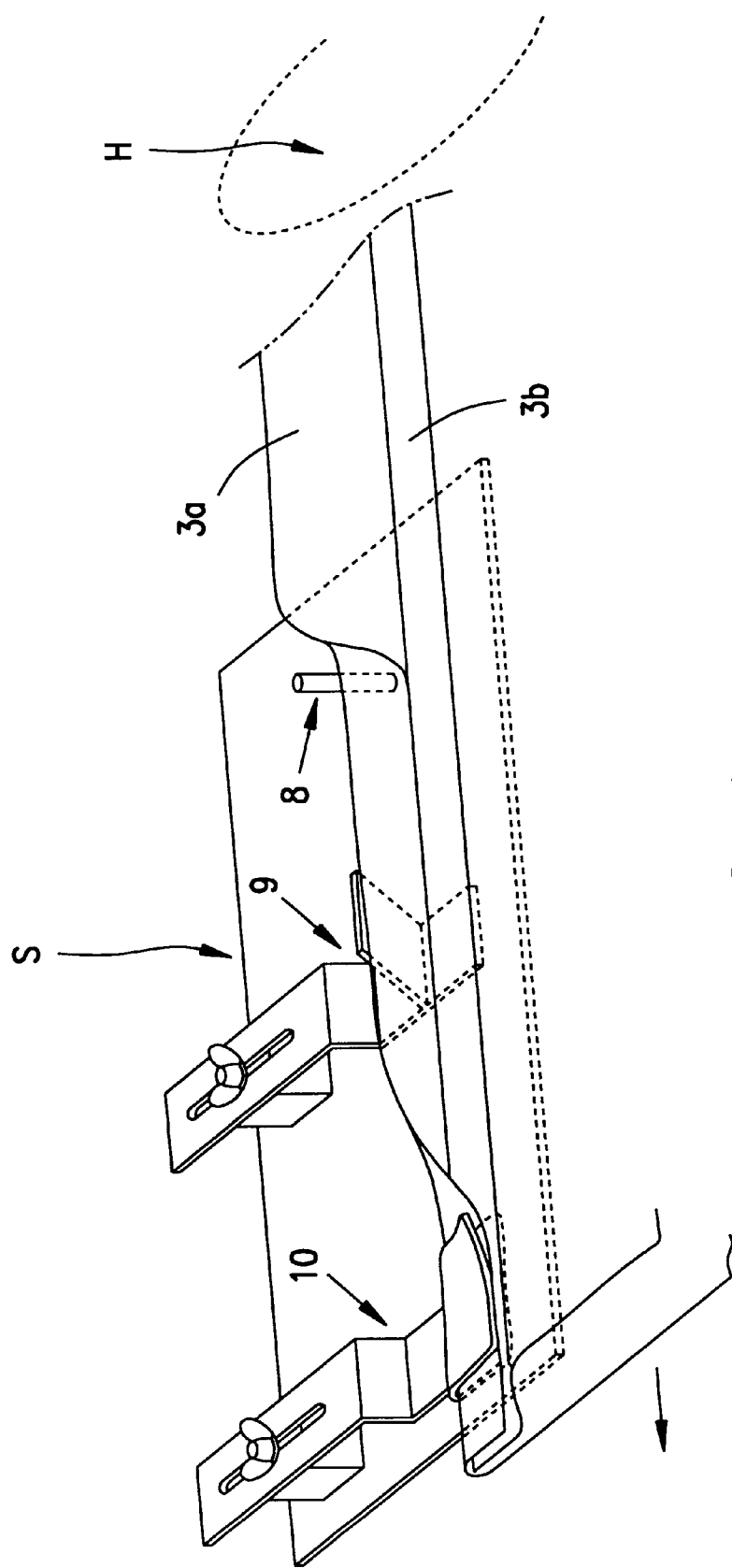
FIG. 4 is a schematically perspective view of a folding former.
Figure 5:
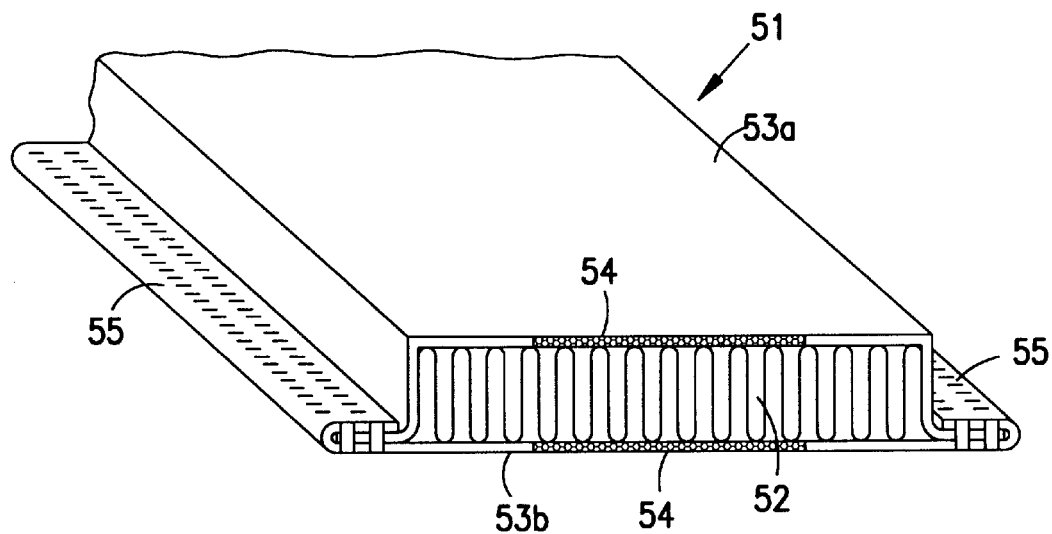
FIG. 5 is a perspective view of a conventional heat insulating structure.
Figure 6:
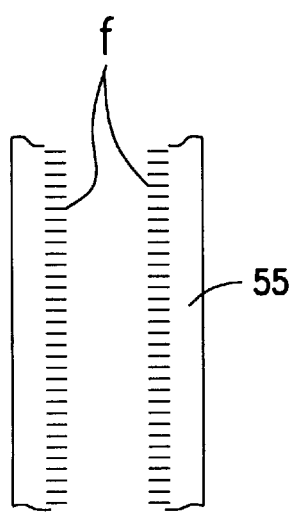
FIG. 6 is a top plan view showing an example of thermal fusion at a combination portion in a conventional heat insulating structure.
Figure 7:
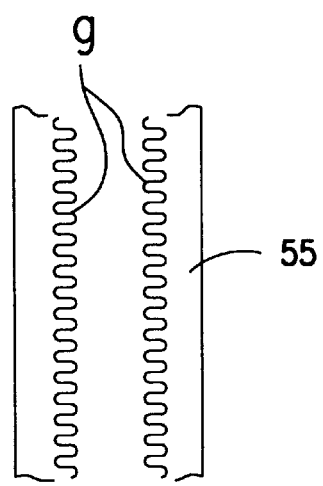
FIG. 7 is a top plan view showing another example of thermal fusion at a combination portion in a conventional heat insulating structure.

FIG. 1 is a perspective view of the heat insulating structure and FIGS. 2 and 3 show the condition of a hotmelt applied to three-ply films. Among these figures, FIGS. 2 and 3 are illustrative views for one and the other combination portions of three-ply films respectively. Also, FIG. 4 is an illustrative view of a folding former. In the present invention, a heat insulating structure 1 is formed as a light fibrous heat insulating material which is widely used for an inside panel or the like in structures. The heat insulating material 1, as shown in FIG. 1, comprises a fibrous glass wool 2 as a heat insulating material and aluminum deposition poly-film 3a and a poly-film 3b as casing materials.

These glass wool 2 and the poly-films 3a and 3b are combined and integrated according to the following method: For example, the lower poly-film 3b made of polyethylene or the like is placed on a conveyer (not shown) and is carried upstream. In an application step H shown in FIG. 4, a hotmelt is applied on the poly-film 3b. The glass wool 2 is placed on the poly-film 3b on which the hotmelt has been applied and further the upper aluminum deposition poly-film 3a is allowed to cover the glass wool 2. Using a folding former S installed in the lower reaches of the conveyer, the end of the poly-film 3b is folded up to clip the end of the upper aluminum deposition poly-film 3a and these ends of the poly-films are glued each other to form a three-ply structure.

In the application step H shown in FIG. 4, a hotmelt 4 is sprayed on the center part of or entire surface of the poly-film 3b and the glass wool 2 is placed on the splayed hotmelt through which it is glued to the poly-film 3b as shown in FIG. 1. At the same time, hotmelts 5 and 6 are respectively applied to an inner portion d and an outer portion e (the positions shown by the dotted line before the folding-up) of both ends of the poly-film 3b.

When the hotmelts 5 and 6 are applied to the both ends of the poly-film 3b, the applications are made to spray the hotmelt spirally and widely on the inner portion d as shown in FIG. 3 and to spray the hotmelt along two lines on the outer portion e as shown in FIG. 2. When spraying the hotmelt spirally, for example, devices are made to spray hotmelt downward from an application nozzle which is aligned to be placed at a prescribed position on the conveyer. Also, plural air nozzles capable of blowing air inward are disposed at prescribed intervals in the circumference of the center application nozzle. The poly-film 3b is allowed to flow on the conveyer in the longitudinal direction at a prescribed velocity to carry out the application while changing the direction of blowing air by controlling the air blown from the plural application nozzles.

When spraying the hotmelt along two lines, the hotmelt is splayed downward from a pair of application nozzles which are aligned to be placed at a prescribed position in the same manner as above and, at the same time, the poly-film 3b is allowed to flow in the longitudinal direction by the conveyer. Also, a hotmelt 7 is splayed on the surface of the glass wool 2 at the same time.

Here, the hotmelts 4 to 7 are normal types which are melted by heating and cured at normal temperature. As these hotmelts 4 to 7, olefin types are used in this embodiment.

After the hotmelts 5, 6, and 7 are applied in this manner, the folding-up and gluing of the both ends are carried out by the folding former S in the lower reaches of the conveyer. Specifically, after the hotmelts 5, 6, and 7 are applied, the aluminum deposition poly-film 3a is covered on the surfaces of the glass wool 2 and the poly-film 3b. In its lower reaches, a pair of No. 1 former 8 are installed on both sides of the conveyer at an interval narrower than the width of the lower poly-film 3b as shown in FIG. 4. In the pair of No. 1 former 8 on both sides, both ends of the lower poly-film 3b can be turned to stand at 90 degrees (in FIG. 1, only one of the pair of No. 1 former 8 is shown). The return line is allowed to coincide almost with the periphery of the upper aluminum deposition poly-film 3a and, at the same time, to accord with the line which equally divides the above inner portion d and outer portion e.

In the lower reaches with respect to the pair of No. 1 former 8 on both sides, similarly, a pair of No. 2 former 9 and a pair of No. 3 former 10 are installed respectively on both sides. Using the pair of No. 2 former 9, the both ends of the lower poly-film 3b are turned at 60 degrees almost in the vicinity of the dividing line between the inner portion d and the outer portion e. Then, using the pair of No. 3 former 10, the both ends of the lower poly-film 3b are folded up to clip and wrap the both ends of the upper aluminum deposition poly-film 3a and thereby to form a three-ply structure, which is then pressed to fix.

When the hotmelts 5 and 6 are cooled to normal temperature, the upper combination portion is glued with two rows of beaded hotmelts 6 extending in the longitudinal direction as shown in FIG. 2 and the lower combination portion is glued with spiraled hotmelt 5 as shown in FIG. 3. These hotmelts 5 and 6 can provide highly adhesive strength. Particularly, the spiraled adhesion allows the glued surface to be wide and the beaded adhesion is extended in the longitudinal direction, exhibiting an extremely highly strengthened resistance to tension in the lateral direction.

In addition, a test was performed by changing the carrying speed of the conveyer (the application speed or gluing speed of the hotmelt) according to the above method. As a result, it was confirmed that if the discharge of the hotmelt is changed in proportion to the speed of the conveyer, adhesion processing can be performed at conveyer speeds ranging 10 to 200 m/minute without any problem. Therefore, comparing with conventional thermal fusion, the freedom of processing speed is high and productivity is significantly improved. Incidentally, the heat insulating structure 1 may be cut into a plurality of materials as products as required.

In the embodiments described above, the hotmelt 4 used for the adhesion between the glass wool 2 and the lower poly-film 3b may be applied to the back face or lower face of the glass wool 2. Also, the hotmelt 7 used for the adhesion between the glass wool 2 and the upper aluminum deposition poly-film 3a may be applied to the back face of the aluminum deposition poly-film 3a. The application in these cases may be either plane application, spiraled application, beaded application, or combinations of these.

Also, the structure may be adopted in which the hotmelt 6 used for the upper combination portion in the portion forming a three-ply structure of the poly-films 3a and 3b is spirally applied and the hotmelt 5 used for the lower combination portion may be either simple spray application, line application, or combinations of other applications.

Furthermore, the folding structure of the upper and lower poly-films is not limited to that of the present embodiment and may be the following structures. For example, both ends of the upper aluminum deposition poly-film 3a are folded inward and glued to the back face of the glass wool 2, the folded part of the aluminum deposition poly-film 3a is glued to the lower aluminum poly-film 3b, and both ends of the poly-film 3b are simply folded to form a two-ply structure. Alternatively, both ends of the Lower poly-film 3b are not folded inward and are simply glued to the upper aluminum deposition poly-film 3a to form a two-ply structure. Further, any other folding structure may be adopted in a free manner.

As is clear from the aforementioned explanations, the heat insulating structure and the method for manufacturing the heat insulating structure in this invention use a hotmelt which is heated and melted in advance when performing the adhesions between a heat insulating material and casing materials and between casing materials, exhibiting the possibilities of great improvement in productivity.

Particularly, the adhesive force of the hotmelt is strong and the freedom of the application method is high. Therefore, the adhesive force can be easily improved and there is no drawback that the glued portion is peeled off even if the both ends are held and pulled in the lateral direction to work for lining or the like.

In addition, the application speed of a hotmelt can be changed in a range of 10 to 200 m/minute, thereby the processing freedom can be increased.

What is claimed is:

1. A method for manufacturing a heat insulating structure having the steps of covering a surface and back face of a fibrous heat insulating material with a first sheet and a second sheet respectively and gluing the sheets to the heat insulating material and continuously gluing both ends of the sheets to each other to fix both sheets to each other, wherein the continuously gluing step comprises the steps of:

applying glue to both ends of the sheets at a prescribed speed along the longitudinal direction of the heat insulating structure;

turning both ends of the second sheet to stand at 90 degree angle almost in a vicinity of a dividing line between an inner portion and an outer portion thereof; then turning both ends of the second sheet at a 60 degree angle, while the heat insulating structure is carried on a conveyer;

folding up both ends of the second sheet to clip and wrap both ends of the first sheet and thereby forming a three-ply structure; and pressing the ends to form a secure fold.

2. A method for manufacturing a heat insulating structure according to claim 1, wherein the application speed and the gluing speed of said hot melt is both 10 to 200 m/minute.

3. A method for manufacturing a heat insulating structure according to claim 1, wherein said first and second sheets include a polymer film.

4. A method for manufacturing a heat insulating structure according to claim 1, wherein said hot melt includes a thermoplastic polymer material.

\* \* \* \* \*

UNITED STATES PATENT AND TRADEMARK OFFICE
CERTIFICATE OF CORRECTION

PATENT NO.: 6,054,004

DATED: Apr. 25, 2000

INVENTOR(S) : Imamura et al.

It is certified that error appears in the above-identified patent and that said Letters Patent is hereby corrected as shown below:

On the title page, delete "PCT Filed: Jul. 14, 1996" and insert --PCT Filed: Jul. 15, 1996--, therefor.

Signed and Sealed this

Tenth Day of April, 2001

Attest:

NICHOLAS P. GODICI

*Attesting Officer*   *Acting Director of the United States Patent and Trademark Office*